US006976193B2

(12) United States Patent
Dubal

(10) Patent No.: US 6,976,193 B2
(45) Date of Patent: Dec. 13, 2005

(54) METHOD FOR RUNNING DIAGNOSTIC UTILITIES IN A MULTI-THREADED OPERATING SYSTEM ENVIRONMENT

(75) Inventor: Scott P. Dubal, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 571 days.

(21) Appl. No.: 09/957,947

(22) Filed: Sep. 20, 2001

(65) Prior Publication Data

US 2003/0115509 A1  Jun. 19, 2003

(51) Int. Cl.[7] .............................................. G06F 11/00
(52) U.S. Cl. ......................................... 714/47; 714/37
(58) Field of Search ..................................... 714/37, 47

(56) References Cited

U.S. PATENT DOCUMENTS

| | | | | |
|---|---|---|---|---|
| 4,665,404 A | * | 5/1987 | Christy et al. ............... 342/463 |
| 5,796,633 A | * | 8/1998 | Burgess et al. .............. 702/187 |
| 6,425,096 B1 | * | 7/2002 | Liese et al. .................... 714/43 |
| 6,449,735 B1 | * | 9/2002 | Edwards et al. .............. 714/25 |
| 6,629,266 B1 | * | 9/2003 | Harper et al. ................. 714/38 |
| 6,633,898 B1 | * | 10/2003 | Seguchi et al. ............. 709/201 |

* cited by examiner

Primary Examiner—Robert Beausoliel
Assistant Examiner—Emerson Puente
(74) Attorney, Agent, or Firm—Blakely, Sokoloff, Taylor & Zafman LLP

(57) ABSTRACT

A method for running diagnostic utilities so as to prevent system disruptions. During initialization of a diagnostic utility, a resource monitoring thread is spawned as a background process to monitor system resource conditions, such as CPU and memory availability and loads. In one embodiment, the resource conditions are continuously monitored by querying performance data written to the system's registry on a periodic basis. In response to user requests to perform diagnostics, the resource monitoring thread (or files written thereby) is/are queried to determined the current resource conditions. If enough resources are available to run the utility's diagnostic routine(s), they are allowed to run. If it is determined that not enough resources are available, the running of the diagnostics is delayed until it is determined that enough resources are available. Alternately, a subset of the diagnostics may be run based on the current resource conditions determined by the resource monitoring thread.

30 Claims, 8 Drawing Sheets

METHOD FOR RUNNING DIAGNOSTIC UTILITIES IN A MULTI-THREADED OPERATING SYSTEM ENVIRONMENT

BACKGROUND OF THE INVENTION

1. Field of the Invention

The present invention concerns computer systems in general, and a method for running diagnostic utilities in multi-threaded operating system environments in particular.

2. Background Information

Diagnostic utilities are used to determine whether a hardware device, such as an adapter card or motherboard PCI device, is functioning properly. Typically, when a diagnostic utility is launched, a predetermined set of diagnostic checks will be performed to ascertain the functionality of the device being checked. A result set will be returned to the diagnostic utility in response to the checks, and the diagnostic utility will provide result feedback to the user.

In general, diagnostic utilities may be provided by the operating system, the system manufacturer, or the component manufacturer. For example, in Microsoft Windows operating systems, such as Windows 2000, a user may run diagnostics on various system components by opening the control panel and navigating to either a built-in diagnostic check, such as those provided by the system manufacturer, or activating the system icon and then selecting the hardware tab from the system properties dialog. This will present a screen that enables the user see properties of various hardware devices by selecting the "device manager" button and then selecting the hardware device. Many of the devices will have build-in diagnostic checks that may be run from that devices properties dialog (e.g., via a "diagnostics" tab).

In addition to accessing diagnostics via the control panel, diagnostic programs may be launched via other user-interface means, such as the start menu or via an icon present in the taskbar tray. The use of taskbar trays has become increasing popular since the enable users to easily launch programs and utilities without having to navigate one or more menus.

Depending on the type of device being tested, various system resources may need to be available to complete the tests. Use of these resources may slow down a system or even make a system appear to be frozen. Even worse, if some diagnostic utilities are launched with insufficient available resources, the diagnostic utility may cause the operating system to crash, requiring the user to reboot the system.

Examples of problems encountered using a typical network adapter diagnostic utility are illustrated in FIGS. 1 and 2. FIG. 1 corresponds to a "frozen" system problem during which the system appears to be inaccessible while all or a portion of the diagnostic utility is running. A utility that enables operation of the network adapter (i.e., an operating system driver and other support modules/drivers) is loaded into memory in a block 10. During a typical user session, the user activates a diagnostic utility in a block 12. The network adapter diagnostics load and run on a selected network adapter in a block 14, including cleaning up memory in a block 16. Due to resource contention or conflicts, the operating system, such as Microsoft Windows, locks up for 10–20 seconds in a block 18. During this time, the user has no control over the system keyboard or mouse. The adapter diagnostics finally return control to the operating system in a block 20.

FIG. 2 illustrates a problem that causes the operating system to crash, as follows. As before, the adapter utility is loaded into memory in a block 22, and the user activates the diagnostic utility in a block 24. The network adapter diagnostics are then loaded in a block 26, and start to run on a selected network adapter in block 28. In this case, the resource conflict (e.g., lack of resources) causes Microsoft Windows to display a blue screen indicating a fatal condition has been generated, as indicated by a block 30. Under this condition, the user must reset the computer system in a block 32.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism by which diagnostic utilities may be performed in a manner that does not disrupt current applications or cause system crashes. Upon loading an initialization portion of a diagnostic utility into memory, a corresponding resource monitoring thread is spawned as a background process that is used to monitor system resource conditions, such as CPU and memory availability and loads. In one embodiment, the resource conditions are continuously monitored by querying performance data that are written to the system's registry on a periodic basis. In response to a user request to perform diagnostics, the resource monitoring thread (or files written thereby) is/are queried to determined the current resource condition. If enough resources are available to run the utility's diagnostic routine(s), they are allowed to run. If it is determined that not enough resources are available, the running of the diagnostics is delayed until it is determined that enough resources are available. Alternately, a subset of the diagnostics may be run based on the current resource condition determined by the resource monitoring thread.

Figure 1:
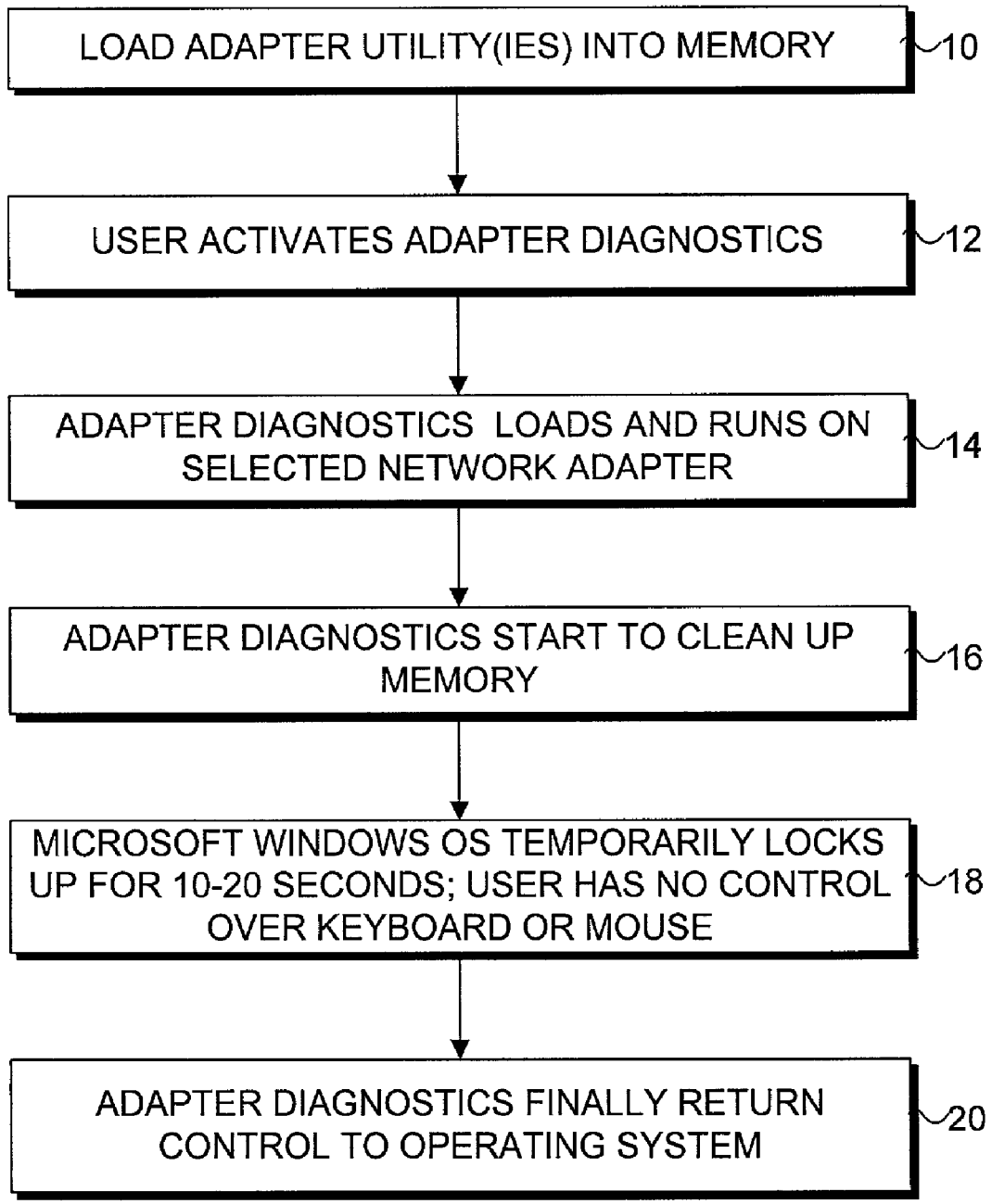
FIG. 1 is a flowchart illustrating a first conventional method for running system or adapter diagnostics that results in a temporary lock up of an operating system due to insufficient resources.
Figure 2:
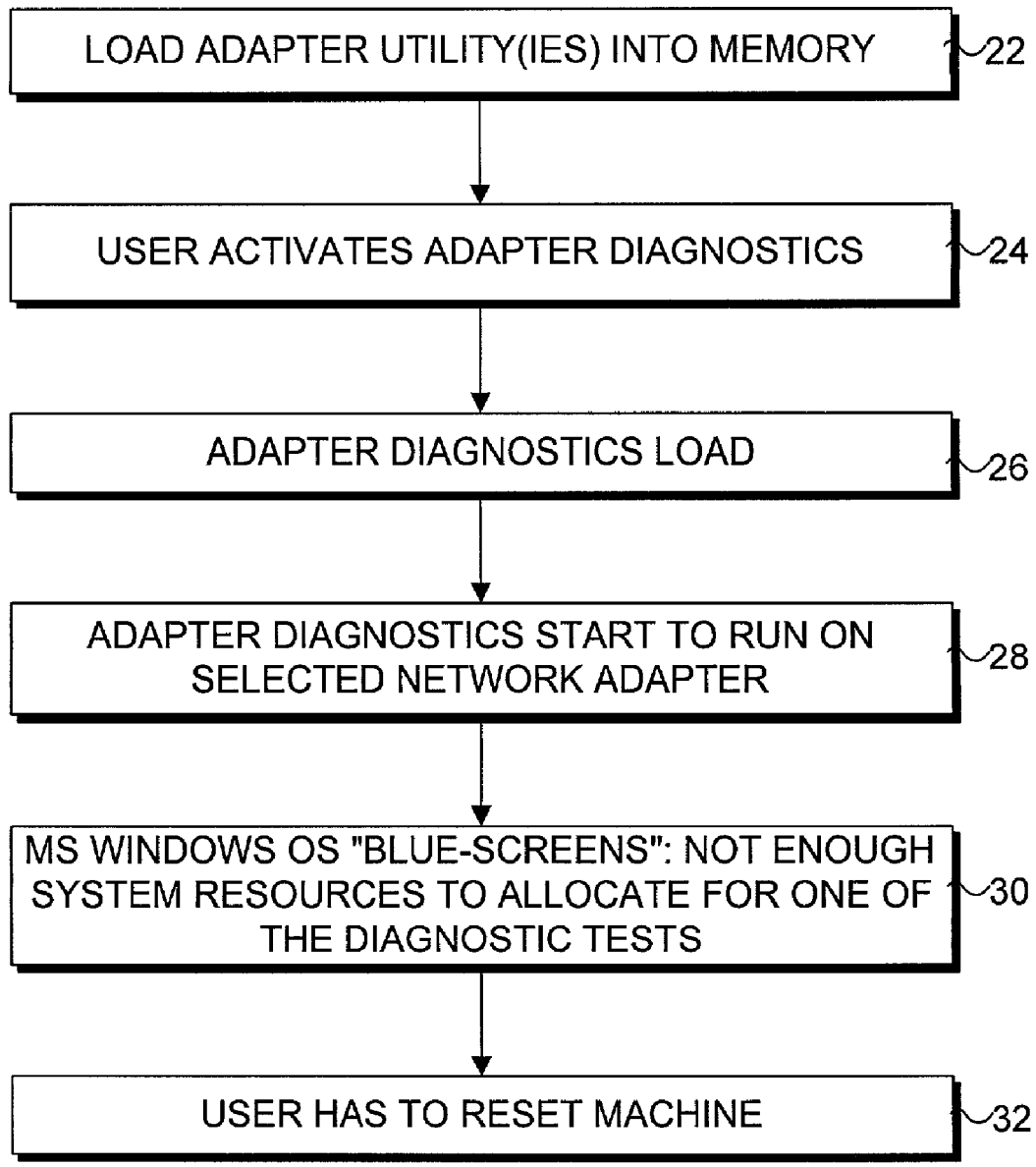
FIG. 2 is a flowchart illustrating a second conventional method for running system or adapter diagnostics that results in a crash of the operating system due to insufficient resources.
Figure 3:
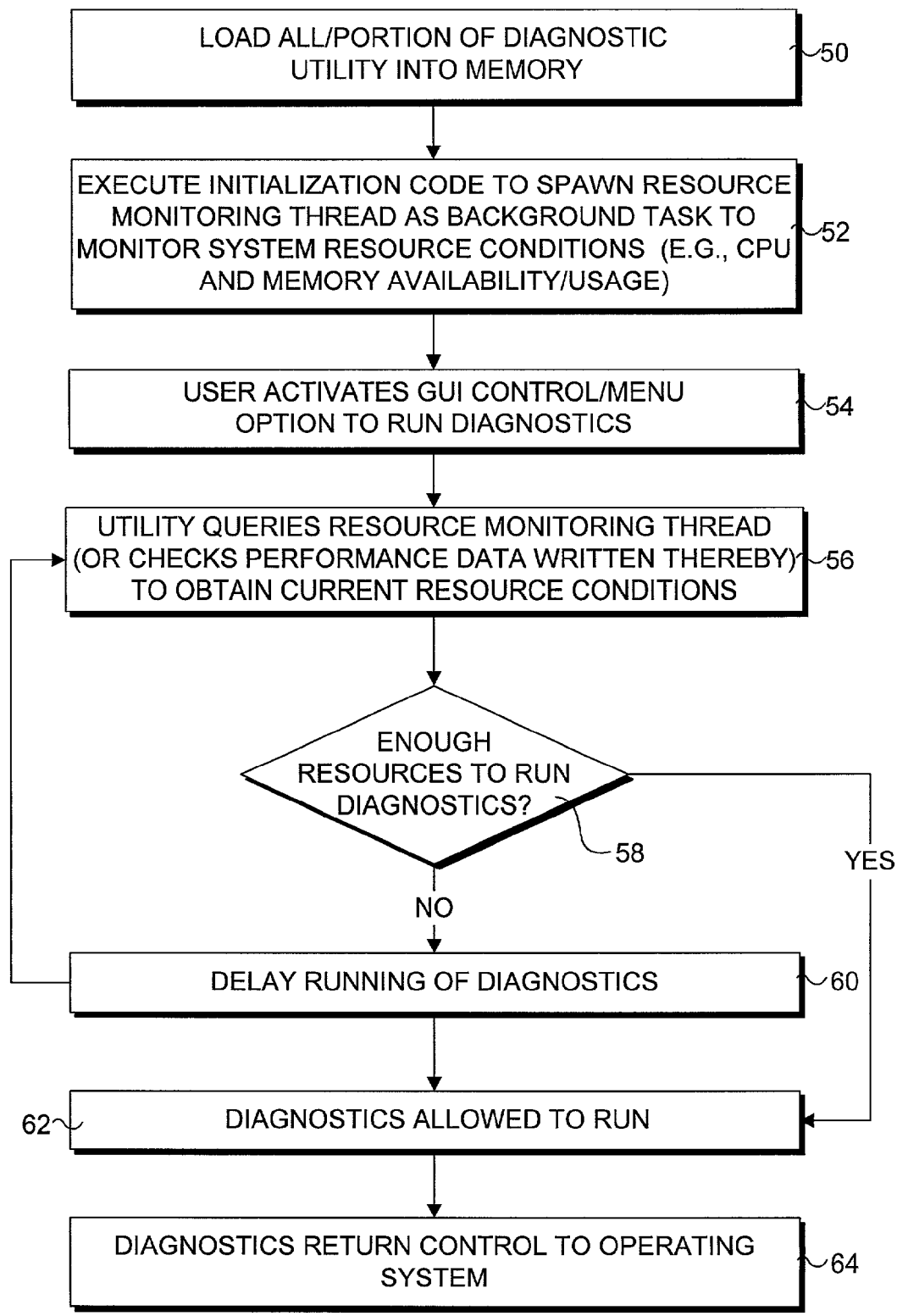
FIG. 3 is a flowchart illustrating a method for running diagnostics in accordance with a first embodiment of the invention, wherein a check is made to whether there are sufficient resources to run diagnostics before they are run.

With reference to FIG. 3, a process for running diagnostic utilities in accordance with a first exemplary embodiment of the invention proceeds as follows. First, in a block 50, all or a portion of a diagnostic utility is loaded into memory. In one embodiment, the portion of the diagnostic utility that is loaded into memory will include a mechanism by which the utility can be selectively requested to be run (i.e., launched) by a user, such as via a graphical user interface (GUI) control. For example, the utility may be activated via an icon in the system tray when used in a Microsoft Windows operation system environment. Optionally, the utility may be launched from a "Start" menu or similar operating system menu.

The portion of the diagnostic utility that is loaded into memory also includes some initialization code that is executed in a block 52 to spawn a resource monitoring thread as a background task (i.e., process) that is used to monitor system resource conditions. For example, CPU and memory availability and loads may be measured by the resource monitoring thread.

In a block 54, a user activates the GUI control or a menu option to run one or more diagnostic program(s) corresponding to the utility. Upon being selected to be run, the utility queries the resource monitoring thread to obtain current resource usage data in a block 56. Optionally, the utility may check for such data in one or more resource monitoring files in which resource load data is written by the resource monitoring thread.

In a decision block 58 a determination is made to whether there are enough resources to run all or a portion of the diagnostics. As explained in further detail below, this will generally be based on a predefined minimum available level of resources. In one embodiment, an "all-or-nothing" outcome results from decision block 58. In other embodiments, the decision block is used to determine if all or a subset of the diagnostics may be run in view of the current resource condition.

If there are not enough current resources available to run the diagnostics, a delay in running the diagnostics is provided in a block 60 and the logic loops back to block 56 to perform the operations of block 56 and 58 again. In one embodiment, the operations of blocks 56, 58, and 60 are performed repeatedly until enough resources are determined to be available. If it is determined that enough resources are available to run the diagnostics, they are allowed to run in a block 62, and control is returned to the operating system in a block 64.

Figure 4:
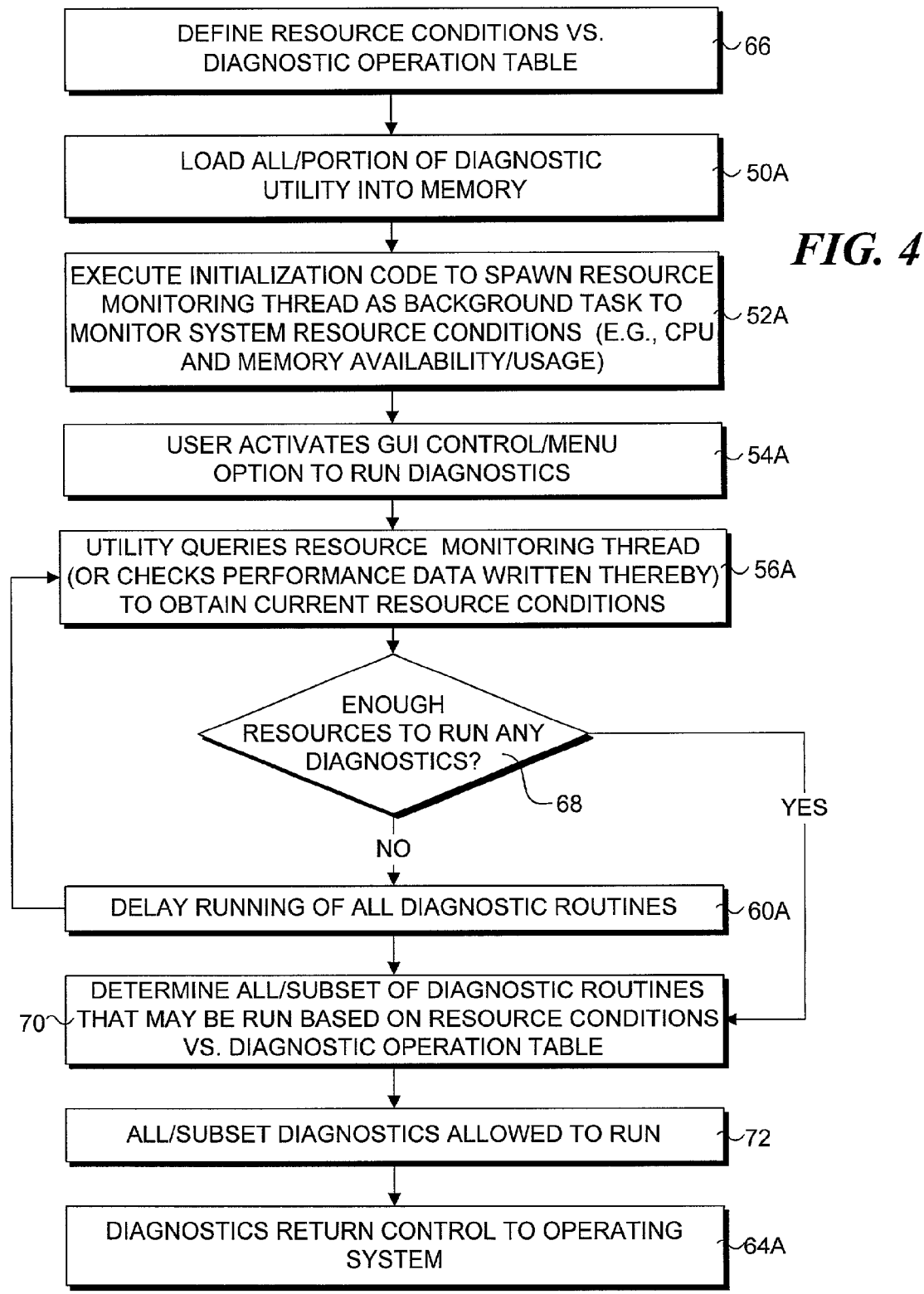
FIG. 4 is a flowchart illustrating a method for running diagnostics in accordance with a second embodiment of the invention, wherein a check is made to whether there are sufficient resources to run all or a subset of diagnostics, and any diagnostics that a capable of running under current resource conditions are run.

The logic used by the invention when performing a process in which the resource monitoring thread provides data that are used to determine whether to run all, a subset of, or no diagnostic programs in accordance with a second exemplary embodiment of the invention is illustrated by the flowchart of FIG. 4. The process begins in a block 66 in which a Resource Condition vs. Diagnostic Operation table is defined. An exemplary set of data corresponding to such a table is shown below in TABLE 1.

TABLE 1

| Resource Condition | Diagnostic Operations to Run |
| --- | --- |
| Processes > 50 | None |
| Processes <= 50 and > 35 | Diagnostic Level 1 |
| Processes <= 35 and > 25 | Diagnostic Level 2 |
| Processes <= 25 | All |
| Mem. Page faults/sec > 20 | None |
| Mem. Page faults/sec <= 20 and > 10 | Diagnostic Level 1 |
| Mem. Page faults/sec <= 10 and > 3 | Diagnostic Level 2 |
| Mem. Page faults/sec <= 3 | All |
| Mem. Available bytes < 5 M | None |
| Mem. Available bytes >= 5 and < 16 | Diagnostic Level 1 |
| Mem. Available bytes >= 16 and < 32 | Diagnostic Level 2 |
| Mem. Available bytes >= 32 | All |
| . . . | |

In TABLE 1, various values in the "Resource Condition" column specify a resource condition, such as number of processes, memory page fault rate, and available memory. The adjacent values in the "Diagnostic Operations to Run" column specify which diagnostics to run under the given resource condition. In this example, the various diagnostic operations that may be run are divided into four levels: "None", "Diagnostic Level 1", "Diagnostic Level 2", and "All". Each level (except for "None") includes one or more diagnostic routines or programs to run when that level is selected to run. In one embodiment, the values in the "Diagnostic Operations to Run" column are logically "ANDED" together such that a least common diagnostic level for all applicable conditions are determined to be capable of being run. In other embodiments, specific conditions may be used to override other conditions in a current set of conditions to identify the proper diagnostic operations to run.

Returning to the flowchart of FIG. 4, the operations performed in blocks 50A, 52A, 54A, and 56A are substantially similar to those performed in the blocks 50, 52, 54, and 56 discussed above with reference to FIG. 3. A determination is then made in a decision block 68 to whether there are enough resources to run any diagnostic routines or programs based on the current resource condition and the values defined in the Resource Condition vs. Diagnostic Operation table. If there are not enough resources to run any of the diagnostic routines (e.g., a circumstance in which one or more resource conditions have a "Diagnostic Operations to Run" value of "None" exists, or an overriding condition with a "Diagnostic Operations to Run" value of "None" exists), a delay is effected in a block 60, as before, and the logic loops back to block 56A, whereupon the operations performed in blocks 56A, 68 and 60A are repeated until the outcome of decision block 68 is yes (TRUE). If there are enough resources to run at least one level of diagnostic routines, the answer to decision block 68 is Yes (TRUE) and the logic proceeds to a block 70 in which a determination is made to which diagnostic routines (e.g., all or a subset defined by an applicable diagnostic level value(s)) may be run. Those diagnostic routines that are determined to be capable of running are then run in a block 72, and control is returned to the operating system in a block 64.

Figure 5:
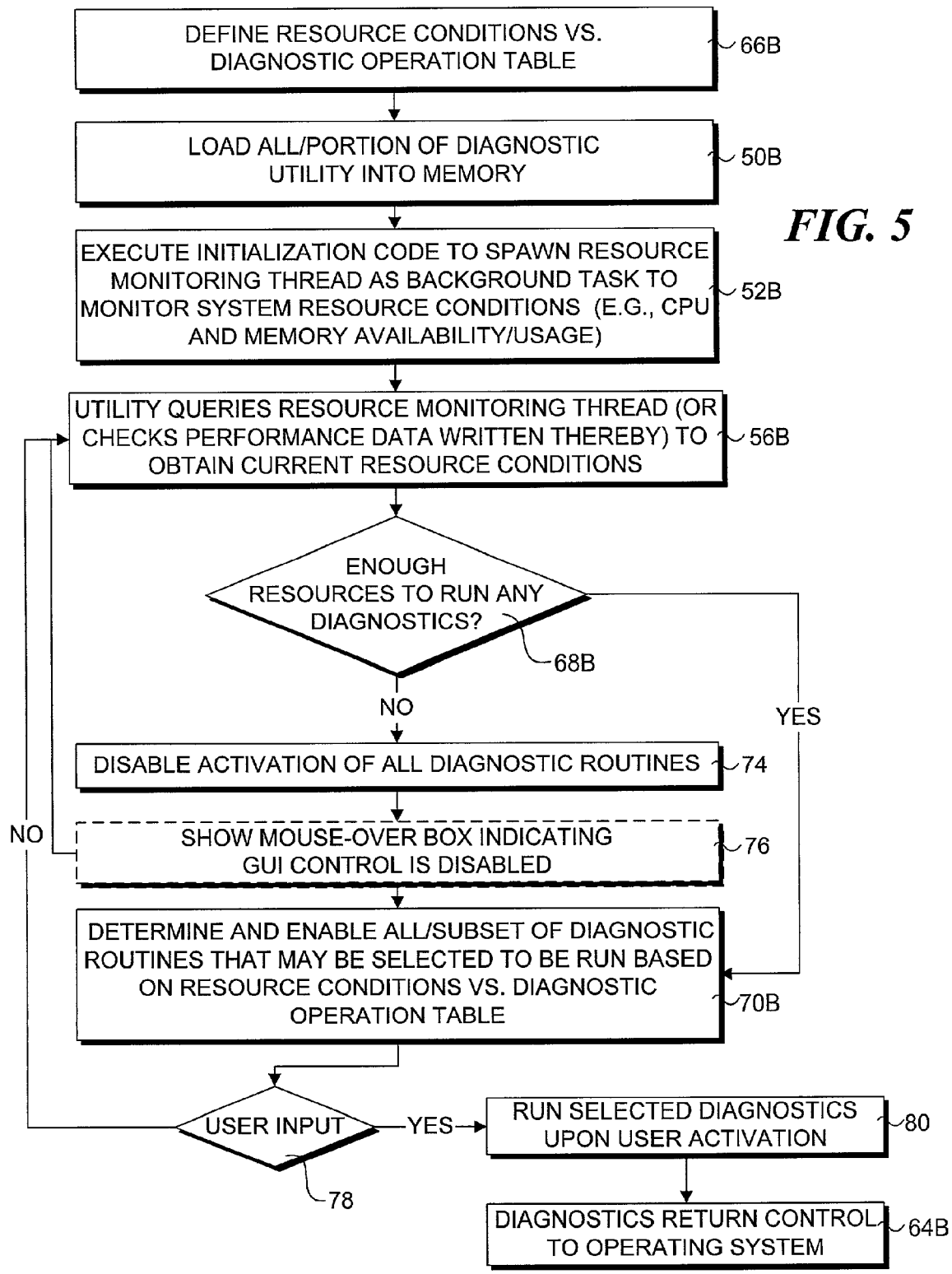
FIG. 5 is a flowchart illustrating a method for running diagnostics in accordance with a third embodiment of the invention, wherein a check is made to whether there are sufficient resources to run various diagnostics on an substantially continuous basis and corresponds user input controls and options for running those diagnostics are enabled or disabled accordingly.

In alternate embodiments, it may be desired to apprise users of when and/or if diagnostic utilities may be run. For example, in one embodiment in accordance with the flowchart of FIG. 5, users are prevented from selecting menu options or activating GUI controls to launch any diagnostic utilities that cannot be run due to a current lack of available resources. In this embodiment, the operations performed in blocks 66B, 50B, 52B and 56B are substantially similar to the operations performed in block 66 of FIG. 4 and blocks 50, 52, and 56 of FIG. 3 as discussed above. In a decision block 68B, a determination to whether there are enough resources to run any diagnostics is performed. If the answer to decision block 68B is No (FALSE), the logic proceeds to a block 74 in which activation of all diagnostic routines is disabled. For instance, any menu item corresponding to a diagnostic routine that is to be disabled may be "grayed" out, while any GUI controls that may normally be used to launch a diagnostic may be disabled. Optionally, a "mouse over" box may be displayed when a user drags the computer cursor over the disabled control informing the user that the control is disabled (along with optional reasons why), as provided by a block 76.

If the answer to decision block 68B is Yes (TRUE), the logic proceeds to a block 70B, in which any diagnostic routines that may be run based on the current resource condition and the rules defined in the Resource Conditions vs. Diagnostic Operation table are determined and corresponding menu options and GUI controls are enabled/disabled, accordingly. The user may then select any enabled menu option or GUI control to run that diagnostic routine or set of diagnostic routines, a decision block 78 and a block 80, whereupon control is returned to the operating system in a block 64B upon completion of the routine(s). In general, the operations performed in blocks 56B, 68B, 74 and 76, 70B and 78 are repeated periodically throughout a user session, such that user interface menus and GUI controls that may be used to activate diagnostic routines or diagnostic operations comprising sets of diagnostic routines are continuously updated to reflect current capabilities to run those diagnostic routines and operations.

Figure 6:
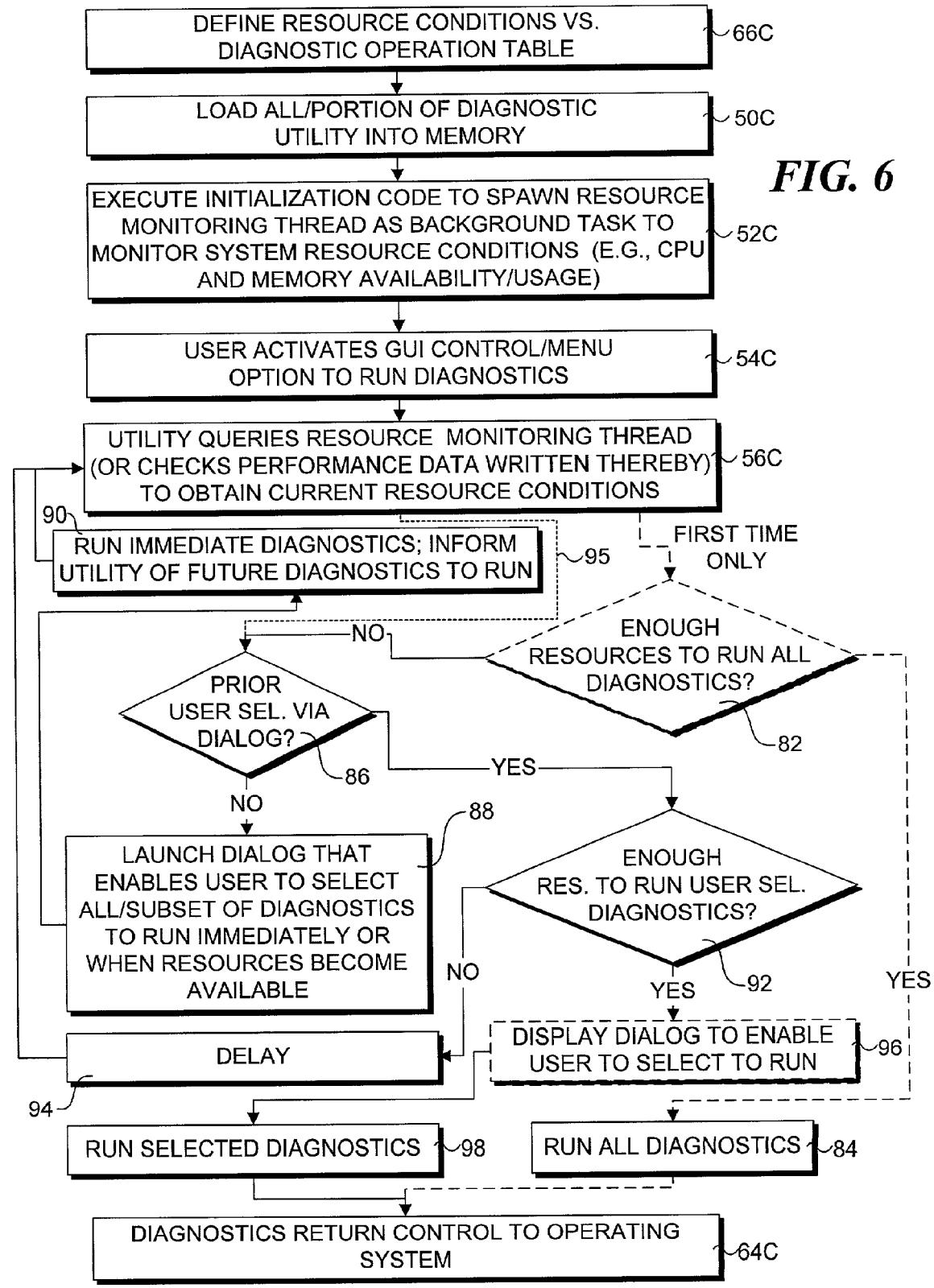
FIG. 6 is a flowchart illustrating a method for running diagnostics in accordance with a forth embodiment of the invention, wherein a dialog is provided that enables users to specify diagnostics to run immediately and in the future and the options made available to the user are dependent on current resource conditions.

In a fourth exemplary embodiment of the invention in accordance with the flowchart of FIG. 6, a dialog is displayed in cases in which there are not enough resources to run a complete set of diagnostics, whereby the user is enabled to select diagnostic routines to run immediately and/or in the future when more resources might become available. In this embodiment, the processing of blocks 66C, 50C, 52C, 54C and 56C are substantially similar to that described above with reference to block 66 of FIG. 4 and blocks 50, 52, 54, and 56 of FIG. 3. In one embodiment, in a decision block 82 a determination is made to whether there are enough resources to run all of the diagnostic routines. If the answer is Yes (TRUE), all of the diagnostic routines are run in a block 84, and return is controlled to the operating system in a block 64C. If the answer to decision block 82 is No (FALSE), the logic proceeds to a decision block 86 in which a determination is made to whether the user has made prior selection of diagnostic routines or diagnostic levels to run via the dialog. If the answer is No (FALSE), the dialog is launched in a block 88. In optional embodiments, the operations performed by decision block 82 may be skipped, such that the logic flows directly from block 56C to decision block 86.

Figure 7:
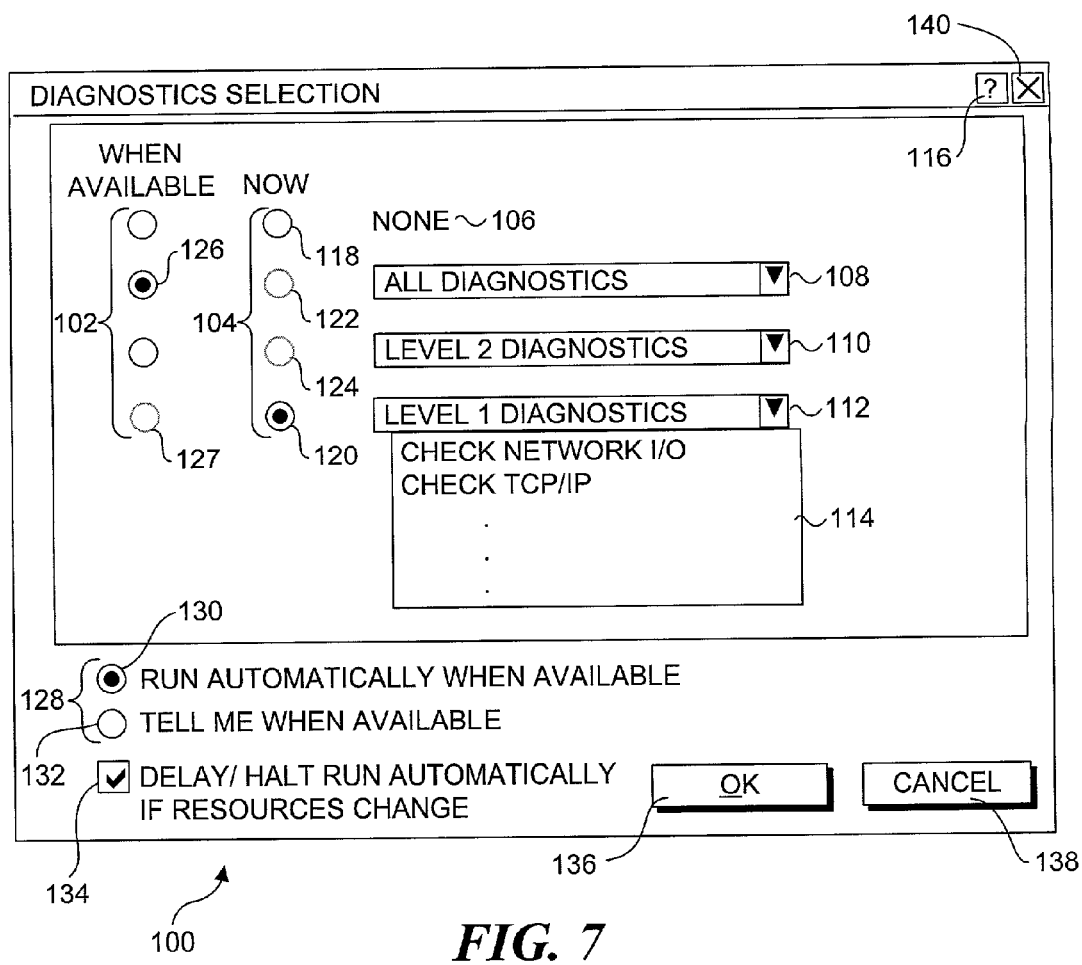
FIG. 7 is a representation of a dialog that enables users to specify selective diagnostics to run immediately and/or in the future in accordance with the embodiment corresponding to the flowchart of FIG. 6.

An exemplary dialog 100 that enables users to select various diagnostic routines to run and when to run them is shown in FIG. 7. Dialog 100 includes a "WHEN AVAILABLE" radio button group 102 and a "NOW" radio button group 104, each of which include a plurality of radio buttons that are disposed adjacent to respective diagnostics options, including a "NONE" option 106, an "ALL DIAGNOSTICS" pulldown control 108, a "LEVEL 2 DIAGNOSTICS" pulldown control 110, and a "LEVEL 1 DIAGNOSTICS" pulldown control 112. Each pulldown control enables users to view a list of diagnostic routines performed by the set of diagnostic operations corresponding to the control, as illustrated by a diagnostic routine list 114. In an optional configuration, each option will appear similar to "NONE" option 106 (i.e., as a text box without a pulldown control). In accordance with this embodiment, if a user desires to find out what diagnostic routines correspond to what option, the user may drag a help icon 116 onto the text for the option.

Dialog 100 enables users to select diagnostic operations to run in the following manner. When the dialog is launched, radio buttons in "NOW" radio button group 104 are enabled or disabled (i.e., grayed) based on whether the set of diagnostics corresponding to the adjacent diagnostic operations level option may be run in consideration of the current resource condition. For example, in the example shown in FIG. 7, radio buttons 118 and 120 appear "active", indicating the adjacent options are available to be run immediately, while radio buttons 122 and 124 are "grayed," indicating that they may not be selected and their adjacent options may not be run immediately. The user may select any one of the active radio buttons in radio button group 104. By default, the highest level of diagnostic routines that may be run immediately will be marked as selected when dialog 100 is launched.

In addition to being able to select sets of diagnostics to run immediately, the user may also select a set of diagnostics to run in the future, if and when resources become available to support running that set of diagnostics. This option is selected by choosing a radio button from among radio button group 102. For example, in the selection shown in FIG. 7, the user has selected to run all diagnostic routines when resources to support running these routines become available in the future by selecting a radio button 128, while immediately running only those diagnostics routines that are included in the set of Level 1 diagnostic operations. In one embodiments, the diagnostic routines that are run in the future will include any routines corresponding to the selected level that are not available to run immediately such that no diagnostic routines are repeated. Alternatively, all diagnostic routines for a given level will be run when that level is determined to be supported by the future resource condition.

In one embodiment, all radio buttons in radio button group 102 that are adjacent to or below the radio button that is selected in radio button group 104 (except for "NONE" radio button 118) will be "grayed," indicating that these radio buttons are not available for selection, such as depicted by a radio button 127. It is assumed in this case that a higher level of diagnostics includes all of the diagnostics that are in the levels below it, and, accordingly, it would not make sense to enable selection of a set of diagnostics to be run in the future if they are already going to be run immediately.

The user may select one button from among a radio button group 128 to indicate how future diagnostics are to be run. For example, the user can select to automatically run the set of diagnostics selected to be run when resources become available by selecting a radio button 130. Optionally, the user can select to have the utility (or background task) inform the user when resources become available to run the selected set of diagnostics by selecting a radio button 132. In one embodiment, the user will be presented with a dialog that informs the user that the selected set of diagnostics may now be run and provides the user with a button or similar UI control to activate to begin running the diagnostics (dialog not shown).

In some instances, it may be desired to automatically delay completion of or halt certain resource-intensive diagnostics if the resources that support running those diagnostics change while the diagnostics are being run. This may be enabled by user activation of a checkbox 134. It will be understood that the change in resources will comprise a change in resources in addition to the self-induced change in resources caused by running the diagnostic utilities, such as if another application suddenly needs system resources that are being used by the diagnostic utility. In one embodiment, delaying a diagnostic routine may be performed by simply changing the priority level of the process corresponding to that diagnostic routine to that of a background task or lower (in Microsoft Windows operating systems), or marking that process as "sleeping" (in LINUX and UNIX operating systems).

When a user has marked a desired set of selections, the user may activate an "OK" button 136, which will close dialog 100, launch the utilities that have been selected to run immediately in a block 90 of FIG. 6, and inform the utility (or resource monitoring thread) what diagnostics the user would like to run in the future when resources become available. Optionally, the user can cancel running any diagnostics by activating a "CANCEL" button 138 or a close window icon 140.

In dialog 100, a user interface is provided that enables users to select to perform diagnostic operations comprising sets of diagnostic routines based on a level assigned to the set. This is not meant to be limiting, as a dialog similar to dialog 100 may be configured so as to enable users to select individual diagnostic routines to run. Preferably, when such a user interface is provided, diagnostic routines that may be run immediately based on current resources will be marked as such, while diagnostic routines that should not be run under the current resources should be disabled to be immediately run and enabled for selection to be run in the future.

Returning to the flowchart of FIG. 6, if the user has already selected diagnostic run information via dialog 100, the answer to decision block 86 will be Yes (TRUE), and the logic flows to a decision block 92 in which a determination is made to whether there are enough resources available to run the diagnostics the user has selected to run when resources become available. If the answer is No (FALSE), the logic proceeds to a delay block 94 in which a delay is performed, whereupon the logic loops back to block 56C. It will be understood that upon subsequent loops, decision block 82 will be skipped if the user has entered information in dialog 100, as indicated by a dashed flow path 95.

If the answer to decision block 92 is Yes (TRUE), the logic proceeds to a block 96 in which a dialog is displayed to enable the user to select to run diagnostics if the user has selected radio button 132 in dialog 100. If the user has selected radio button 130, this operation is skipped. The selected diagnostics are then performed in a block 94, and control is returned to the operating system in block 64C.

Monitoring System Resources

In general, it will be desired to monitor system resources that pertain to the type of diagnostics that are to be performed. For example, if it is desired to perform network device or peripheral device diagnostics, the resources that should be monitored will pertain to resources that are necessary to perform the diagnostic routines corresponding to the network device or peripheral device. Typically, the resources that will be monitored will include the CPU(s) and memory.

Low memory conditions can slow the operation of applications and services and impact the performance of other system resources. For example, when a computer is low on memory, paging—that is, the process of moving virtual memory back and forth between physical memory and disks—can be prolonged, resulting in more work for the disks. Because this involves reading and writing to disk, the paging activity might have to compete with whatever other disk transactions are being performed, intensifying a disk bottleneck. (A disk bottleneck occurs when disk performance decreases to the extent that is affects overall system performance.) In turn, all this work by the disk can mean that the CPU is used less or is doing unnecessary work, processing numerous interrupts due to repeated page faults.

In order to monitor CPU, memory, and other resources, it is necessary to be able to access such information. In many modern operating systems, such as Microsoft Windows NT, 98, and 2000, LINUX, and various UNIX operating systems, the operating system constantly tracks certain performance data and stores this data in a manner that enables the data to be used (typically for internal functions). In Windows operating systems, this information is stored in the system registry.

It is possible to retrieve raw, low-level data by constructing special strings to read the data from the registry. However, this is generally difficult because much of the information in the registry is variable length and/or optional. In order to address these limitations, Microsoft developed a set of API's (application program interfaces) for accessing and interpreting performance data from the registry. These API's are collectively provided by a performance data helper dynamic link library called PDH.DLL.

Using PDH.DLL requires a developer to understand several key concepts: counters, queries, and paths. A counter represents a single piece of data about some object (such as the number of threads in a particular process), and is referred to by handles called HCOUNTERS. A query is represented by an HQUERY handle, and consists of one or more counters that have been added to it. When a query is executed, the data in the corresponding counters is updated. The same query may be used over and over again to update the counter values.

Paths specify what data to obtain. A path comprises a text string that completely defines what PDH.DLL needs to locate a particular counter. For example, consider the following counter path:

"\\Susan\Thread($NT/0#0)\% Privileged Time"

This counter path specifies that on a machine named "Susan", there is a thread object instance associated with the 4NT process. Within that thread instance is a counter that specifies the percentage of time that the thread is in privileged (kernel) mode. The forward slash of the /0#0 portion of the path indicates a parent relationship. In this case, the thread belongs to he $0^{th}$ instance of 4NT.exe. The # represents a child relationship. In this case, the thread is the $0^{th}$ thread within the process. If multiple copies of 4NT.exe where active, the counter paths would be 4NT/1#0, $NT/2#0, etc. Likewise, if the first instance of 4NT has multiple threads, the counters would be 4NT/0#1, 4NT/0#2, etc.

A source code listing for an exemplary application that queries counter data for a single counter and writes the counter data to a display is shown below in LISTING 1.

LISTING 1

```
//========================================================
#include <windows.h>
#include <stdio.h>
#include <conio.h>
#include "pdh.h"
//============== Global Variables ========================
HQUERY g_hQuery = 0;
HCOUNTER g_hCounter = 0;
TCHAR g_szCounterPath[256] = "\\\Processor<0#0>\Interrupts/sec";
//=============== Code ===================================
int main( )
{
  // Get a query handle
  PdhOpenQuery( NULL, 0, &g_hQuery );
  // Add a counter whose path is defined by g_szCounterPath
  PdhAddCounter( g_hQuery, g_szCounterPath, 0, &g_hCounter );
  // Loop forever
  while ( 1 )
  {
    PDH_FMT_COUNTERVALUE fmtValue;
    PDH_RAW_COUNTER rawCtr;
    if ( g_hCounter )
    {
      // Go update the data in the counters
      PdhCollectQueryData( g_hQuery );
      // Get the formatted version of the counter value
      PdhGetFormattedCounterValue(g_hCounter, PDH_FMT_LONG,
              0, &fmtValue);
      // Get the "raw" counter value.
      PdhGetRawCounterValue( g_hCounter, 0, &rawCtr );
      // Print out counter path, the formatted value, and the
      // raw value.
      _tprintf( _T("%s %8u raw:%I64u\n"), g_szCounterPath,
          fmtValue.longValue, (LONG)rawCtr.FirstValue );
    }
    // Sleep for 1 second
    Sleep( 1000 );
  }
  return 0;
}
//========================================================
```

With reference to the main( ) procedure, the first operation that needs to be performed is to obtain a query handle (HQUERY) by calling PdhOpenQuery. PdhOpenQuery returns the HQUERY by writing it to the buffer passed as the last parameter, which references g_hQuery, a global variable that stores the query handle. Use of a global variables will enable data to be more easily shared between other functions (not shown) that may retrieve and manipulate performance data. After an HQUERY is established, the next step is to associate a counter (HCOUNTER) with the query. Obtaining a counter in turn depends on getting a path to describe the counter. An example path of "\\\Processor<0#0>\Interrupts/sec" is used in LISTING 1, which indicates the counter is to correspond to the interrupts per second value of the $0^{th}$ instance of the $0^{th}$ processor in the local machine.

After the counter path is defined, an HCOUNTER is created by passing the counter path to the PdhAddCounter API. PdhAddCounter takes an HQUERY and a counter path is input parameters. An HCOUNTER buffer is filled in if everything is in proper condition. If it is desired to associate some other data with an HCOUTNER (e.g., a pointer), the data can be passed to PdhAddCounter and retrieved later using the PdhGetCounterInfo API.

The procedure now goes into an infinite loop, wherein data is gathered and displayed once a second. The values in the counters are first updated using the PdhCollectQueryData API through reference to the global query handle g_hQuery. The formatted version of the counter value is then retrieved using the PdhGetFormattedCounterValue API, while the "raw" counter value is retrieved using the PdhGetRawCounterValue API. Both values are then displayed to the screen.

The foregoing source code illustrates an exemplary method for retrieving performance data. In an actual implementation, the various performance data would most likely be written to a buffer or a file, rather than the display, and counter paths would be defined based on resource parameter data that corresponds to the diagnostics that are to be run. Further details for using PDH.DLL are available in various columns in the Microsoft Systems Journal, including a May 1998 column entitled "Under the Hood," written by Matt Pietrek, and an August 1998 column entitled "Custom Performance Monitoring for Your Windows NT Application, written by Jeffrey Richter.

As discussed above, performance data pertaining to the availability and use of system processors and memory will generally be used when determining whether current resource conditions are adequate for performing many diagnostic operations. An exemplary set of objects and counters that may be used to monitor corresponding resource conditions are shown below in TABLE 2.

TABLE 2

| TO MONITOR FOR: | USE THIS OBJECT/COUNTER |
| --- | --- |
| Memory shortages | Memory/Available Bytes |
| | Process (All_processes)/Working Set |
| | Memory/Pages/sec |
| | Memory/Cache Bytes |
| Frequent hard page faults | Memory/Pages/sec |
| | Process (All_processes)/Working Set |
| | Memory/Pages Input/sec |
| | Memory/Pages Output/sec |
| Excess paging with a disk bottleneck | Memory/Page Reads/sec |
| | Physical Disk/Avg. Disk Bytes/Read |
| Paging file fragmentation | Physical Disk/Split IOs/sec |
| | Physical Disk/% Disk Read Time |
| | Physical Disk/Current Disk Queue Length |
| | Process/Handle count |
| Memory leaks; memory-Intensive applications | Memory/Pool Nonpaged Allocations |
| | Memory/Pool Nonpaged Bytes |
| | Memory/Pool Paged Bytes |
| | Process (process_name)/Pool Nonpaged Bytes |
| | Process (process_name)/Handle Count |
| | Process (process_name)/Pool Paged Bytes |
| | Process (process_name)/Virtual Bytes |
| | Process (process_name)/Private Bytes |
| Cache Manager efficiency | Cache/Copy Read Hits % |
| | Cache/Copy Reads/sec |
| | Cache/Data Map Hits % |
| | Cache/Data Maps/sec |
| | Cache/MDL Read Hits % |
| | Cache/MDL Reads/sec |
| | Cache/Pin Read Hits % |
| | Cache/Pin Reads/sec |
| | To identify cache bottlenecks, also use Memory/Page Input/sec with these counters |

Exemplary Machine for Implementing the Invention

Figure 8:
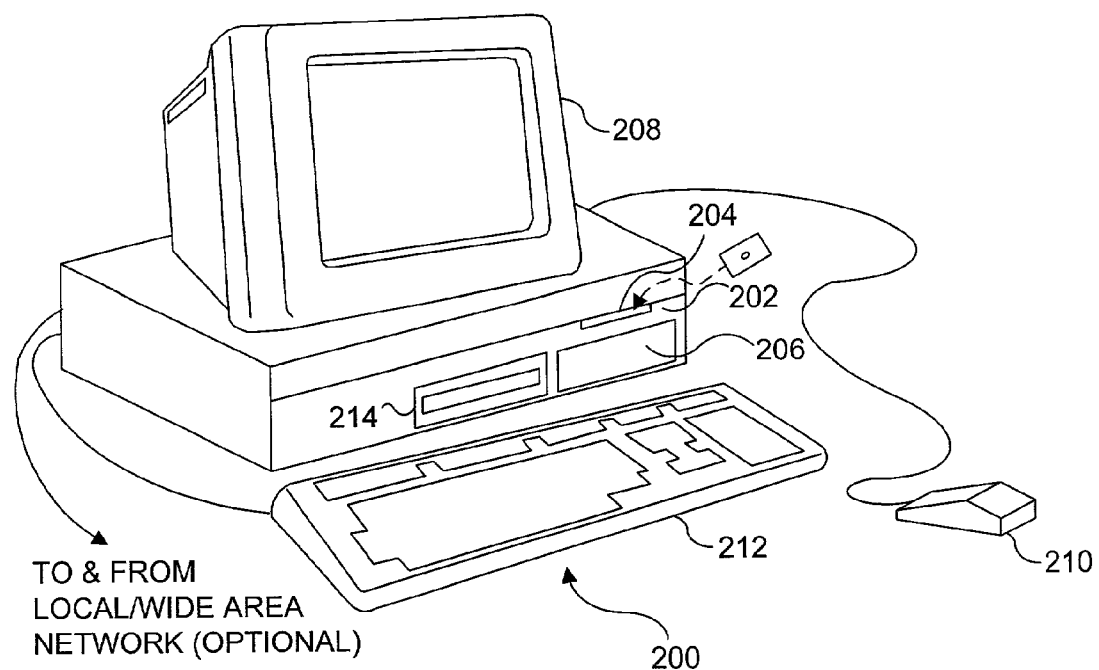
FIG. 8 is a schematic diagram of an exemplary computer system that may be used to practice the invention.

With reference to FIG. 8, a generally conventional personal computer 200 is illustrated, which is suitable for use in connection with practicing the present invention. The operations the invention are facilitated by one or more software modules comprising machine-executable instructions that may be executed on personal computer 200, or other types of computers, including workstations, laptops, and computer servers. Personal computer 200 includes a processor chassis 202 in which are mounted a floppy disk drive 204, a hard drive 206, a motherboard populated with appropriate integrated circuits including one or more microprocessors and memory modules (all not shown), and a power supply (also not shown), as are generally well known to those of ordinary skill in the art. It will be understood that hard drive 206 may comprise a single unit, or multiple hard drives, and may optionally reside outside of computer 200. A video subsystem including and video adapter (not shown) and a monitor 208 is included for displaying graphics and text generated by software programs and program modules that are run by the computer. A mouse 210 (or other pointing device) may be connected to a serial port (or to a bus port or USB port) on the rear of processor chassis 202, and signals from mouse 210 are conveyed to the motherboard to control a cursor on the display and to select text, menu options, and graphic components displayed on monitor 208 by software programs and modules executing on the computer. In addition, a keyboard 212 is coupled to the motherboard for user entry of text and commands that affect the running of software programs executing on the computer. Computer 200 may also include a network interface card (not shown) for connecting the computer to a computer network, such as a local area network, wide area network, or the Internet Computer 200 may also optionally include a compact disk-read only memory (CD-ROM) drive 214 into which a CD-ROM disk may be inserted so that executable files and data on the disk can be read for transfer into the memory and/or into storage on hard drive 206 of computer 200. Other mass memory storage devices such as an optical recorded medium or DVD drive may be included. The machine instructions comprising the software program that causes the CPU to implement the operations of the present invention that have been discussed above will likely be distributed on floppy disks or CD-ROMs (or other memory media) and stored in the hard drive until loaded into random access memory (RAM) for execution by the CPU. Optionally, the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for performing diagnostics on a single computer, comprising:
    spawning a resource monitoring thread that operates as an operating system background task and monitors computer system resource availability and loads on a substantially continuous basis;
    enabling a user to request to run diagnostics on the single computer via a user interface component;
    in response to a user request to run diagnostics, checking computer system resource availability and load data provided by the resource monitoring thread to determine if there are adequate resources to run the diagnostics; and
    running the diagnostics on the single computer if it is determined there are enough resources to run the diagnostics.

2. The method of claim 1, wherein it is determined that there are not enough resources to run the diagnostics, the method further including:
    periodically checking system resource availability and/or resource load data provided by the resource monitoring thread to determine if enough resources become available to run the diagnostics; and
    running the diagnostics if it is determined that enough resources have become available.

3. The method of claim 1, further comprising:
    loading at least a portion of a diagnostic utility that includes one or more diagnostic routines that are used to perform the diagnostics, said at least portion including an initialization code portion corresponding to the resource monitoring thread; and
    executing at least the initialization code portion of the diagnostic utility to spawn the resource monitoring thread.

4. The method of claim 1, wherein the diagnostics include a plurality of diagnostic routines that may be executed by the computer either individually or in sets to perform corresponding diagnostic operations, further comprising:
    defining resource conditions under which specific diagnostics operations are capable of being performed;
    determining current resource conditions based on system resource availability and/or load data provided by the resource monitoring thread; and
    in response to the user request to run diagnostics, running diagnostic routines corresponding to the diagnostic operations that are specified as being capable of being performed under the current resource conditions.

5. The method of claim 1, further comprising:
    periodically determining current resource conditions based on resource availability and/or load data provided by the resource monitoring thread; and
    enabling and disabling one or more user interface objects that are used to enable the user to request diagnostics be run based on the current resource conditions such that a user may select diagnostics to run when the current resource conditions are adequate to support running those diagnostics and the user is prevented from selecting diagnostics to run when the current resource conditions are inadequate to support running those diagnostics.

6. The method of claim 1, further comprising:
    periodically determining current resource conditions based on resource availability and/or load data provided by the resource monitoring thread; and
    delaying and/or halting operation of at least a portion of diagnostic operations that are either currently running or scheduled to begin running immediately upon completion of any currently running diagnostic operations if it is determined that the current resource conditions no longer support running said at least a portion of diagnostic operations.

7. A method for performing diagnostics on a single computer, comprising:
    defining resource conditions for the single computer under which specific diagnostics operations on the sinle computer are capable of being performed;
    spawning a resource monitoring thread that operates as an operating system background task and monitors computer system resource availability and loads on a substantially continuous basis;

enabling a user to request to run diagnostics on the single computer via a user interface component;

in response to a user request to run diagnostics, checking resource availability and/or load data provided by the resource monitoring thread to determine current resource conditions for the single computer;

providing a user interface (UI) object that enables the user to select specific diagnostic operations to be performed via selectable UI controls in the UI object, wherein at least a portion of the selectable UI controls are enabled or disabled based on the current resource conditions; and performing any diagnostic operations selected by the user to be performed that are capable of being performed under the current resource conditions.

8. The method of claim 7, wherein the UI object includes selectable UI controls that enable the user to both specify diagnostic operations to be performed immediately and request diagnostic operations that cannot be performed immediately due to a lack of resources to be performed in the future when and if adequate resources become available, further comprising:

performing any diagnostic operations selected by the user to be performed immediately that are capable of being performed under the current resource conditions;

periodically determining current resource conditions based on resource availability and/or load data provided by the resource monitoring thread; and performing diagnostic operations selected by the user to be performed in the future if it is determined those diagnostic operations are capable of being run under the current resource conditions.

9. The method of claim 7, wherein the UI object includes selectable UI controls that enable the user to both specify diagnostic operations to be preformed immediately and request diagnostic operations that cannot be performed immediately due to a lack of resources to be performed in the future when and if adequate resources become available, further comprising:

performing any diagnostic operations selected by the user to be performed immediately that are capable of being performed under the current resource conditions;

periodically determining current resource conditions based on resource availability and/or load data provided by the resource monitoring thread; and providing a UI object that informs the user when the current resource conditions provide adequate resources to run the diagnostic operations selected by the user to run in the future and enables the user to select to immediately run the diagnostic operations; and immediately performing the diagnostic operations.

10. The method of claim 7, wherein the UI object provides selectable UI controls that enable a user to define levels of diagnostic operations to be performed, wherein each level includes at least one diagnostic routine.

11. A machine-readable media having a plurality of machine instructions stored thereon that when executed by a single computer performs the operations of:

spawning a resource monitoring thread that operates as an operating system background task and monitors system resource availability and loads on a substantially continuous basis;

enabling a user to request to run diagnostics via a user interface component;

in response to a user request to run diagnostics, checking resource availability and load data provided by the resource monitoring thread to determine if the single computer has adequate resources to run the diagnostics; and running the diagnostics on the single computer if it is determined there are enough resources to run the diagnostics.

12. The machine-readable media of claim 11, wherein it is initially determined that there are not enough resources to run the diagnostics and execution of the machine instructions further performs the operations of:

periodically checking system resource availability and/or resource load data provided by the resource monitoring thread to determine if enough resources become available to run the diagnostics; and running the diagnostics if it is determined that enough resources have become available.

13. The machine-readable media of claim 11, wherein execution of the machine instructions further performs the operations of:

loading at least a portion of a diagnostic utility that includes one or more diagnostic routines that are used to perform the diagnostics, said at least portion including an initialization code portion corresponding to the resource monitoring thread; and executing at least the initialization code portion of the diagnostic utility to spawn the resource monitoring thread.

14. The machine-readable media of claim 11, wherein the diagnostics include a plurality of diagnostic routines that may be executed by the computer either individually or in sets to perform corresponding diagnostic operations, and wherein execution of the machine instructions further performs the operations of:

storing predefined resource conditions under which specific diagnostics operations are capable of being performed;

determining current resource conditions based on system resource availability and/or load data provided by the resource monitoring thread; and in response to the user request to run diagnostics, running diagnostic routines corresponding to the diagnostic operations that are specified as being capable of being performed under the current resource conditions.

15. The machine-readable media of 11, wherein execution of the machine instructions further performs the operations of:

periodically determining current resource conditions based on resource availability and/or load data provided by the resource monitoring thread; and enabling and disabling one or more user interface objects that are used to enable the user to request diagnostics be run based on the current resource conditions such that a user may select diagnostics to run when the current resource conditions are adequate to support running those diagnostics and the user is prevented from selecting diagnostics to run when the current resource conditions are inadequate to support running those diagnostics.

16. The machine-readable media of claim 11, wherein execution of the machine instructions further performs the operations of:

periodically determining current resource conditions based on resource availability and/or load data provided by the resource monitoring thread; and delaying and/or halting operation of at least a portion of diagnostic operations that are either currently running or scheduled to begin running immediately upon completion of any currently running diagnostic operations if it is determined that the current resource conditions no longer support running said at least a portion of diagnostic operations.

17. A machine-readable media having a plurality of machine instructions stored thereon that when executed by a single computer performs the operations of:
storing predefined resource conditions under which specific diagnostics operations are capable of being performed;
spawning a resource monitoring thread that operates as an operating system background task and monitors system resource availability and loads on a substantially continuous basis;
enabling a user to request to run diagnostics on the single computer via a user interface component;
in response to a user request to run diagnostics, checking resource availability and/or load data provided by the resource monitoring thread to determine current resource conditions for the single computer;
providing a user interface (UI) object that enables the user to select specific diagnostic operations to be performed via selectable UI controls in the UI object, wherein at least a portion of the selectable UI controls are enabled or disabled based on the current resource conditions; and
performing any diagnostic operations selected by the user to be performed that are capable of being performed under the current resource conditions.

18. The machine-readable media of claim 17, wherein the UI object includes selectable UI controls that enable the user to both specify diagnostic operations to be preformed immediately and request diagnostic operations that cannot be performed immediately due to a lack of resources to be performed in the future when and if adequate resources become available, and wherein execution of the machine instructions further performs the operations of:
performing any diagnostic operations selected by the user to be performed immediately that are capable of being performed under the current resource conditions;
periodically determining current resource conditions based on resource availability and/or load data provided by the resource monitoring thread; and
performing diagnostic operations selected by the user to be performed in the future if it is determined those diagnostic operations are capable of being run under the current resource conditions.

19. The machine-readable media of claim 17, wherein the UI object includes selectable UI controls that enable the user to both specify diagnostic operations to be preformed immediately and request diagnostic operations that cannot be performed immediately due to a lack of resources to be performed in the future when and if adequate resources become available, and wherein execution of the machine instructions further performs the operations of:
performing any diagnostic operations selected by the user to be performed immediately that are capable of being performed under the current resource conditions;
periodically determining current resource conditions based on resource availability and/or load data provided by the resource monitoring thread; and
providing a UI object that informs the user when the current resource conditions provide adequate resources to run the diagnostic operations selected by the user to run in the future and enables the user to select to immediately run the diagnostic operations; and
immediately performing the diagnostic operations.

20. The machine-readable media of claim 17, wherein the UI object provides selectable UI controls that enable a user to define levels of diagnostic operations to be performed, wherein each level includes at least one diagnostic routine.

21. A single computer comprising:
a processor;
a video subsystem including a video display adapter component operatively coupled to the processor and a video display on which text and graphics may be displayed; and
a memory operatively coupled to the processor, to store a plurality of machine instructions that when executed by the processor cause the single computer to perform the operations of:
spawning a resource monitoring thread that operates as an operating system background task and monitors system resource availability and loads on a substantially continuous basis;
enabling a user to request to run diagnostics on the single computer via a user interface component;
in response to a user request to run diagnostics, checking resource availability and load data provided by the resource monitoring thread to determine if there are adequate resources to run the diagnostics; and
running the diagnostics if it is determined there are enough resources to run the diagnostics.

22. The computer of claim 21, wherein it is initially determined that there are not enough resources to run the diagnostics and execution of the machine instructions by the processor further performs the operations of:
periodically checking system resource availability and/or resource load data provided by the resource monitoring thread to determine if enough resources become available to run the diagnostics; and
running the diagnostics if it is determined that enough resources have become available.

23. The computer of claim 21, wherein execution of the machine instructions by the processor further performs the operations of:
loading at least a portion of a diagnostic utility that includes one or more diagnostic routines that are used to perform the diagnostics, said at least portion including an initialization code portion corresponding to the resource monitoring thread; and
executing at least the initialization code portion of the diagnostic utility to spawn the resource monitoring thread.

24. The computer of claim 21, wherein the diagnostics include a plurality of diagnostic routines that may be executed by the computer either individually or in sets to perform corresponding diagnostic operations, and wherein execution of the machine instructions by the processor further performs the operations of:
storing predefined resource conditions under which specific diagnostics operations are capable of being performed;
determining current resource conditions based on system resource availability and/or load data provided by the resource monitoring thread; and
in response to the user request to run diagnostics, running diagnostic routines corresponding to the diagnostic operations that are specified as being capable of being performed under the current resource conditions.

25. The computer of 21, wherein execution of the machine instructions by the processor further performs the operations of:

periodically determining current resource conditions based on resource availability and/or load data provided by the resource monitoring thread; and enabling and disabling one or more user interface objects that are used to enable the user to request diagnostics be run based on the current resource conditions such that a user may select diagnostics to run when the current resource conditions are adequate to support running those diagnostics and the user is prevented from selecting diagnostics to run when the current resource conditions are inadequate to support running those diagnostics.

26. The computer of claim 21, wherein execution of the machine instructions by the processor further performs the operations of:

periodically determining current resource conditions based on resource availability and/or load data provided by the resource monitoring thread; and delaying and/or halting operation of at least a portion of diagnostic operations that are either currently running or scheduled to begin running immediately upon completion of any currently running diagnostic operations if it is determined that the current resource conditions no longer support running said at least a portion of diagnostic operations.

27. A single computer comprising:

a processor;

a video subsystem including a video display adapter component operatively coupled to the processor and a video display on which text and graphics may be displayed; and a memory operatively coupled to the processor, to store a plurality of machine instructions that when executed by the processor cause the single computer to perform the operations of:

storing predefined resource conditions under which specific diagnostics operations are capable of being performed by the single computer;

spawning a resource monitoring thread that operates as an operating system background task and monitors system resource availability and loads on a substantially continuous basis;

enabling a user to request to run diagnostics via a user interface component;

in response to a user request to run diagnostics, checking resource availability and/or load data provided by the resource monitoring thread to determine current resource conditions;

providing a user interface (UI) object that enables the user to select specific diagnostic operations to be performed via selectable UI controls in the UI object, wherein at least a portion of the selectable UI controls are enabled or disabled based on the current resource conditions; and performing any diagnostic operations selected by the user to be performed that are capable of being performed under the current resource conditions.

28. The computer of claim 27, wherein the UI object includes selectable UI controls that enable the user to both specify diagnostic operations to be preformed immediately and request diagnostic operations that cannot be performed immediately due to a lack of resources to be performed in the future when and if adequate resources become available, and wherein execution of the machine instructions by the processor further performs the operations of:

performing any diagnostic operations selected by the user to be performed immediately that are capable of being performed under the current resource conditions;

periodically determining current resource conditions based on resource availability and/or load data provided by the resource monitoring thread; and performing diagnostic operations selected by the user to be performed in the future if it is determined those diagnostic operations are capable of being run under the current resource conditions.

29. The computer of claim 27, wherein the UI object includes selectable UI controls that enable the user to both specify diagnostic operations to be preformed immediately and request diagnostic operations that cannot be performed immediately due to a lack of resources to be performed in the future when and if adequate resources become available, and wherein execution of the machine instructions by the processor further performs the operations of:

performing any diagnostic operations selected by the user to be performed immediately that are capable of being performed under the current resource conditions;

periodically determining current resource conditions based on resource availability and/or load data provided by the resource monitoring thread; and providing a UI object that informs the user when the current resource conditions provide adequate resources to run the diagnostic operations selected by the user to run in the future and enables the user to select to immediately run the diagnostic operations; and immediately performing the diagnostic operations.

30. The computer of claim 27, wherein the UI object provides selectable UI controls that enable a user to define levels of diagnostic operations to be performed, wherein each level includes at least one diagnostic routine.

* * * * *